Sept. 4, 1923.

G. SUNDBACK

METHOD AND MACHINE FOR MAKING FASTENERS

Filed July 10, 1919    14 Sheets-Sheet 1

INVENTOR
Gideon Sundback,
BY
ATTORNEY

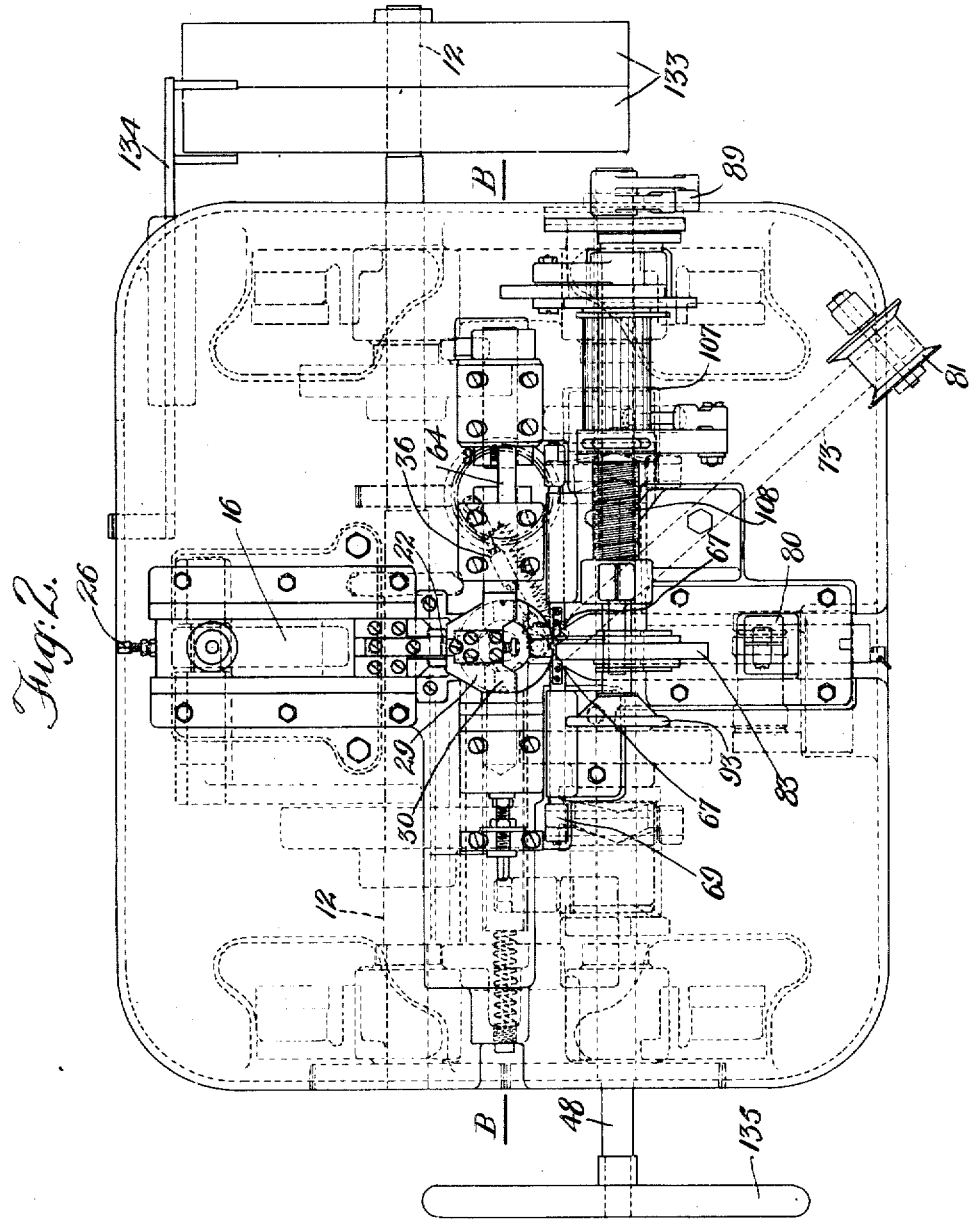

Sept. 4, 1923.
G. SUNDBACK
1,467,015
METHOD AND MACHINE FOR MAKING FASTENERS
Filed July 10, 1919 14 Sheets-Sheet 3
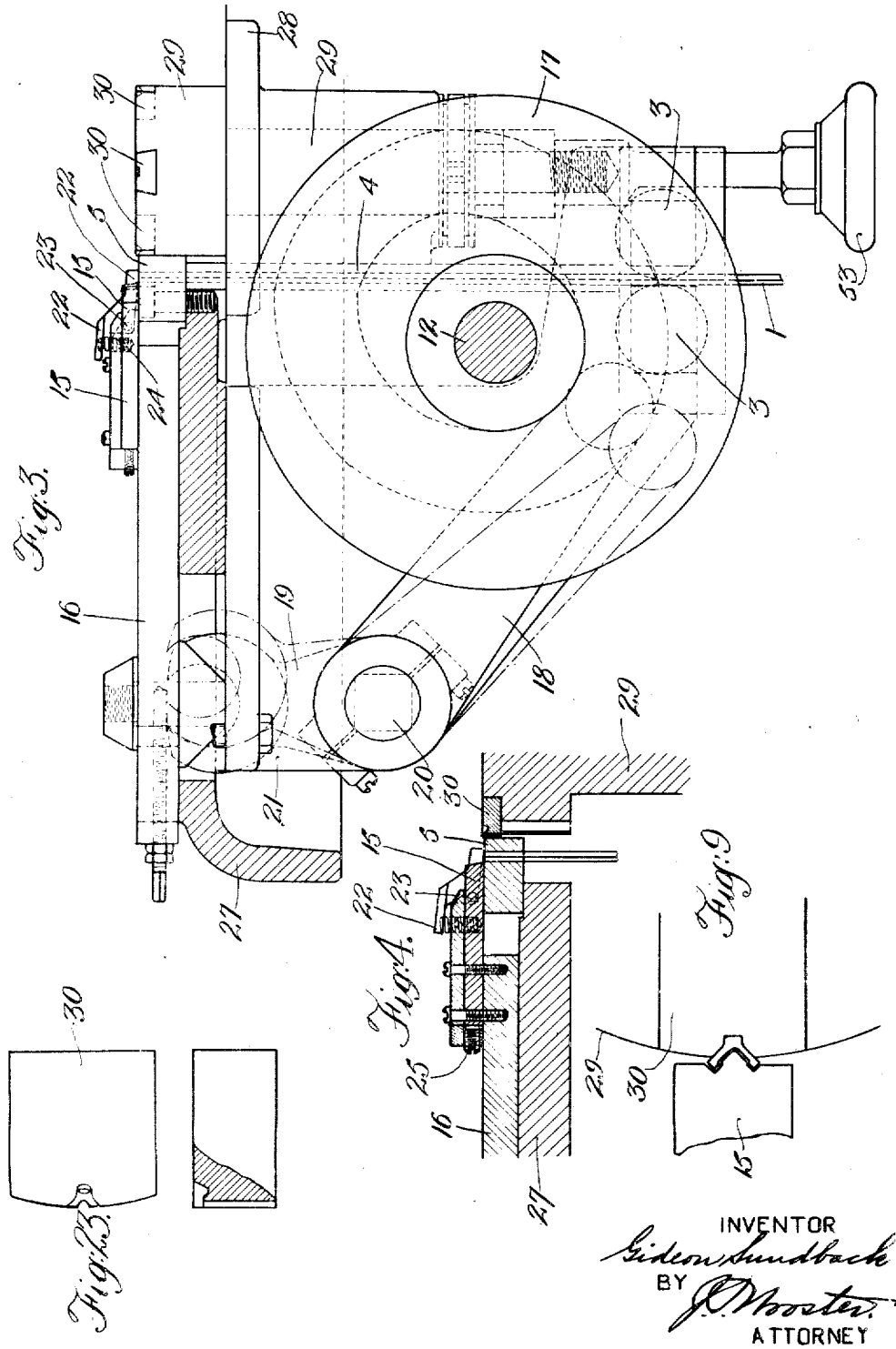
INVENTOR
Gideon Sundback
BY
J. Wooster
ATTORNEY

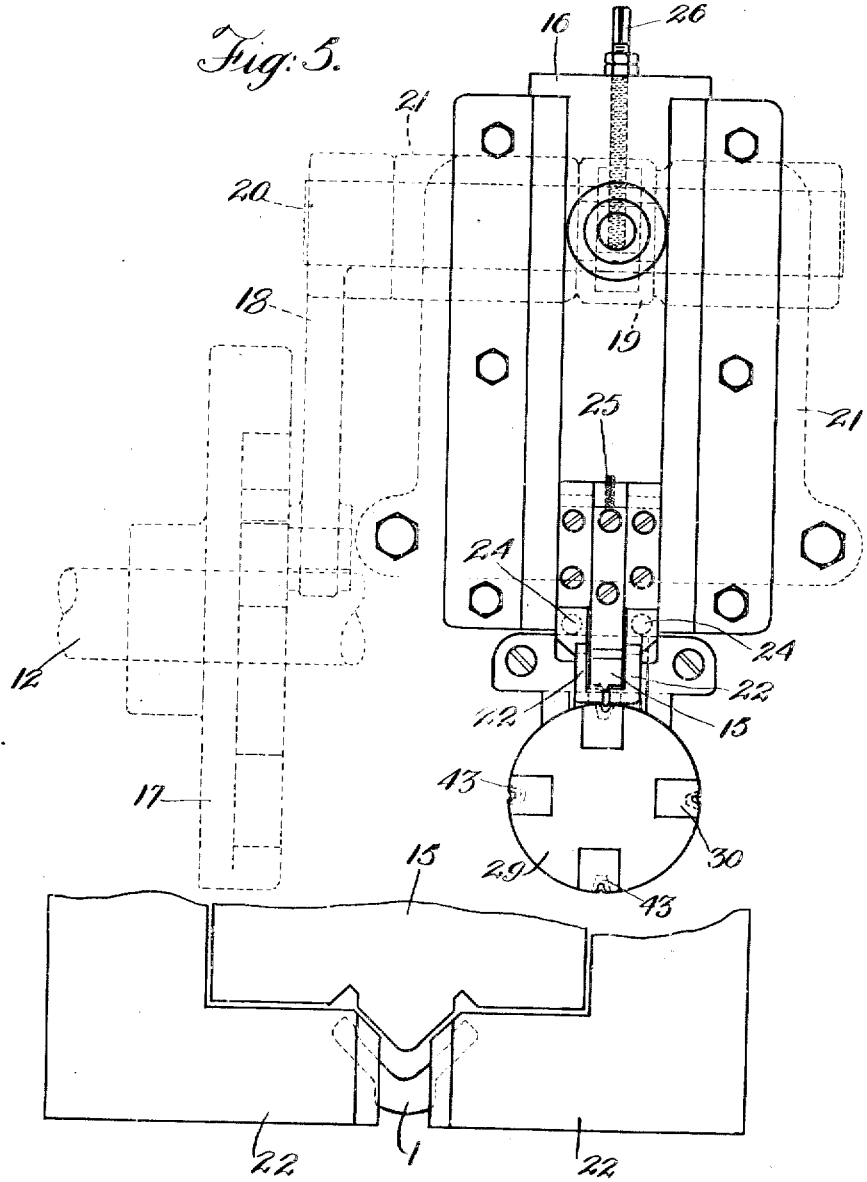

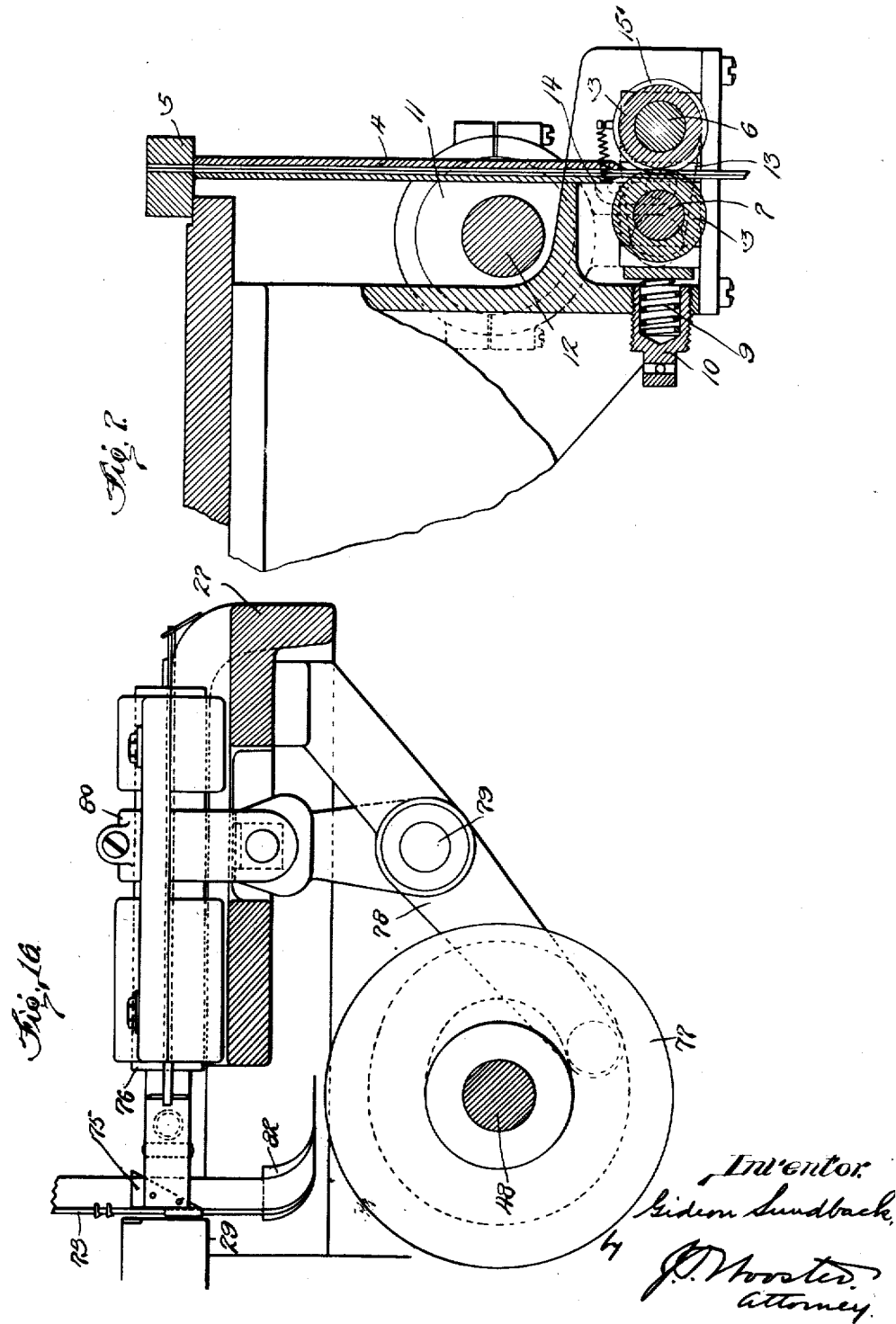

Sept. 4, 1923.
G. SUNDBACK
METHOD AND MACHINE FOR MAKING FASTENERS
Filed July 10, 1919  14 Sheets-Sheet 6
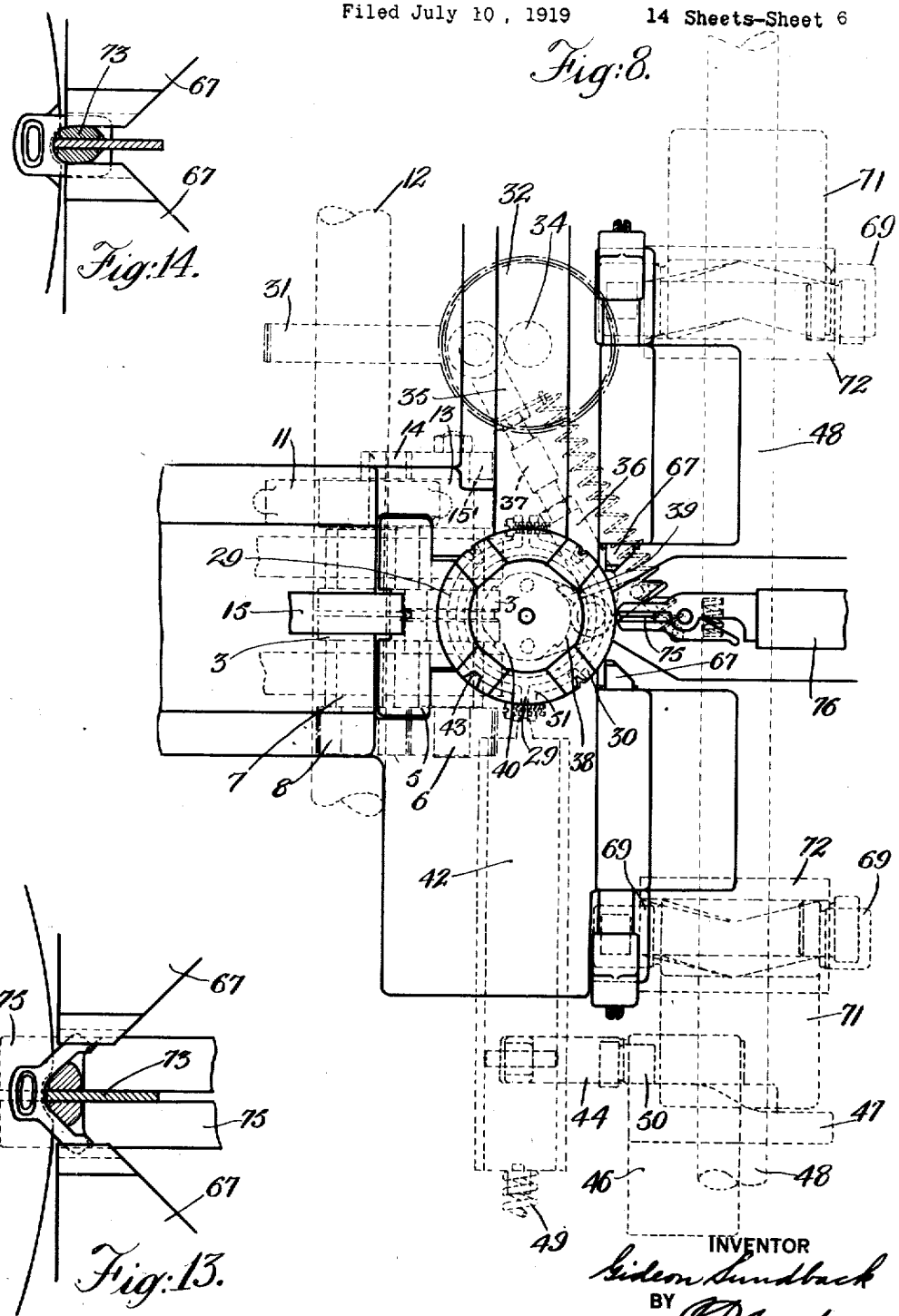

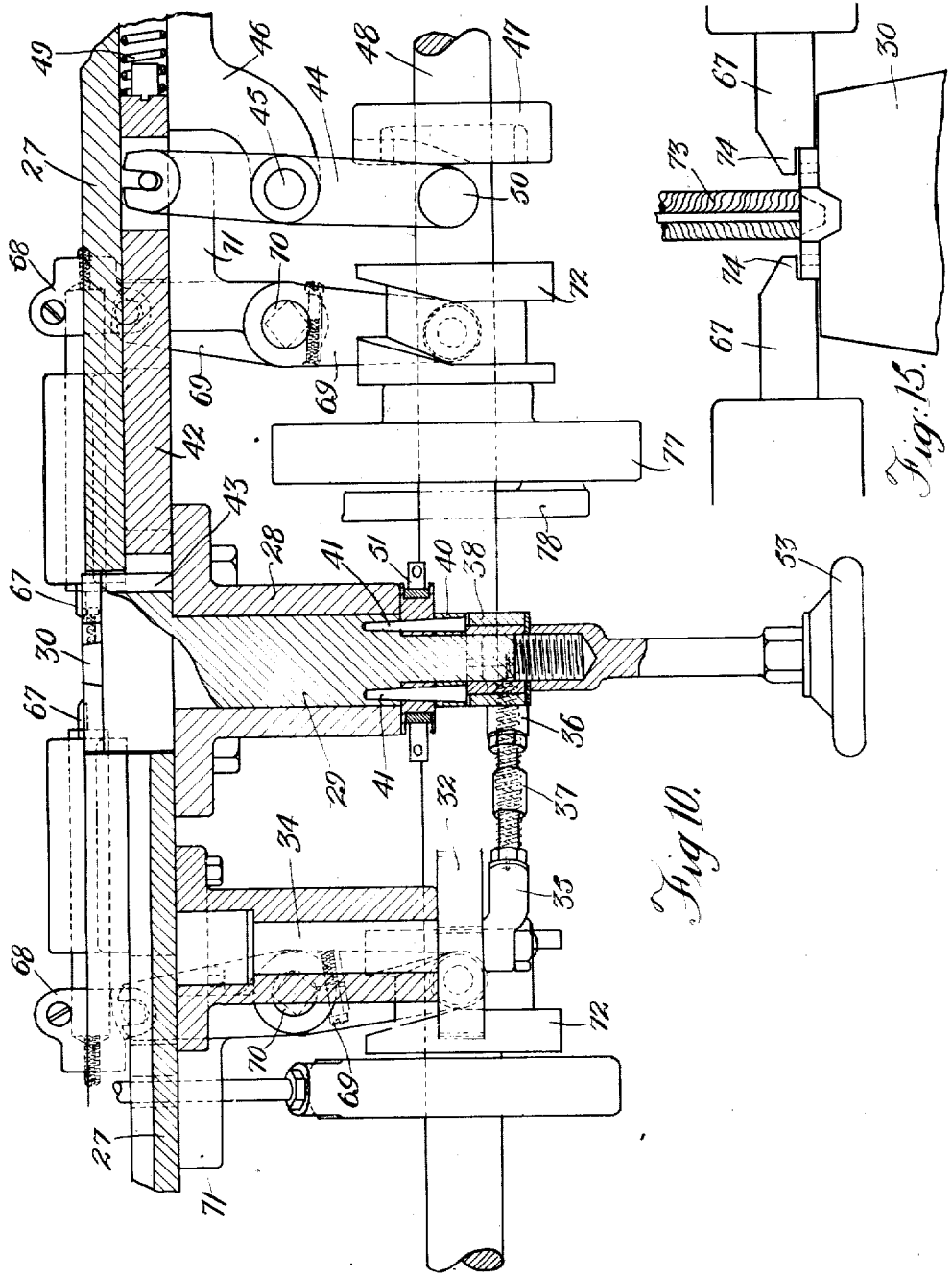

Sept. 4, 1923.
G. SUNDBACK
1,467,015
METHOD AND MACHINE FOR MAKING FASTENERS
Filed July 10, 1919  14 Sheets-Sheet 8
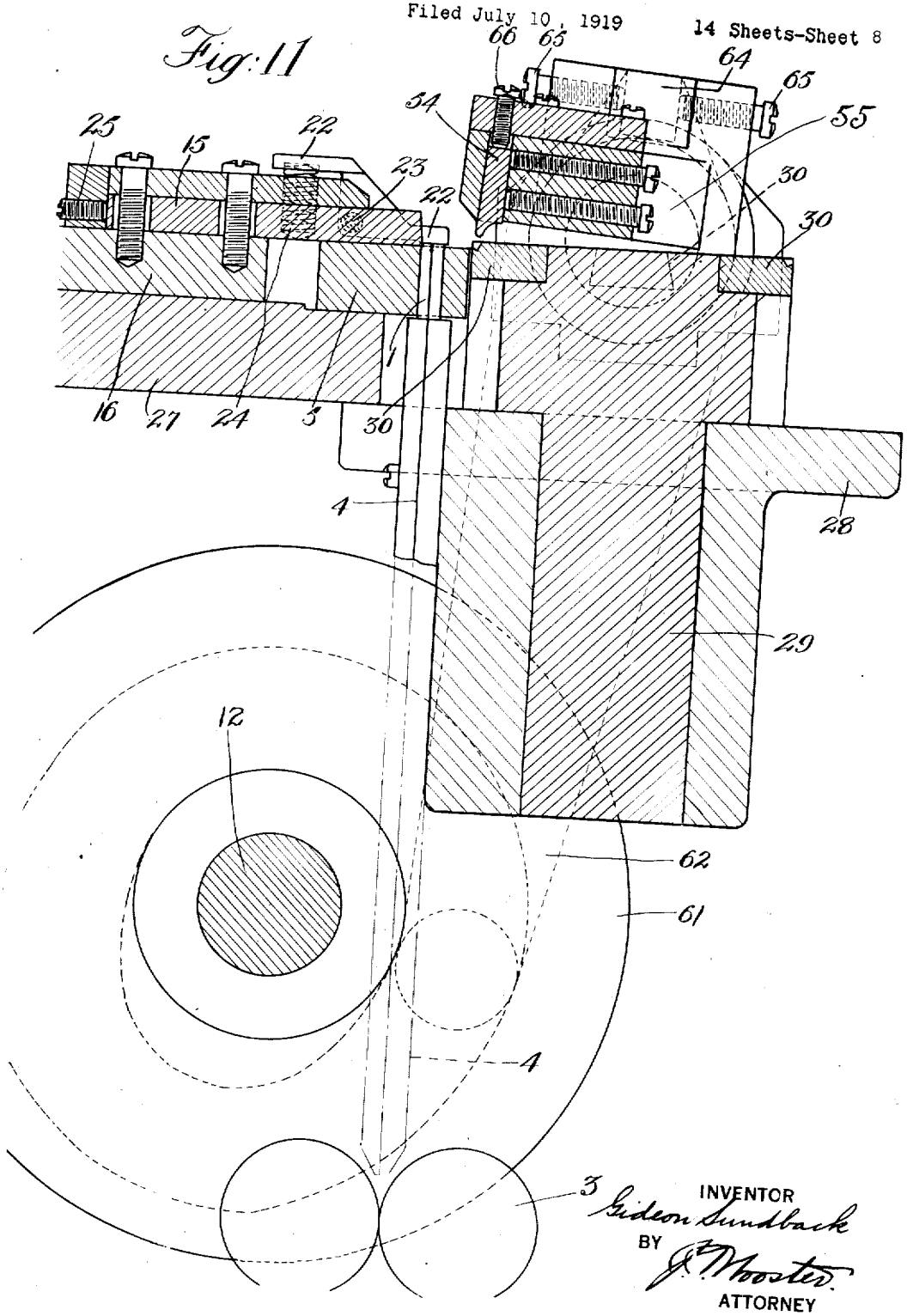

Sept. 4, 1923.  
G. SUNDBACK  
METHOD AND MACHINE FOR MAKING FASTENERS  
Filed July 10, 1919   14 Sheets-Sheet 9
1,467,015
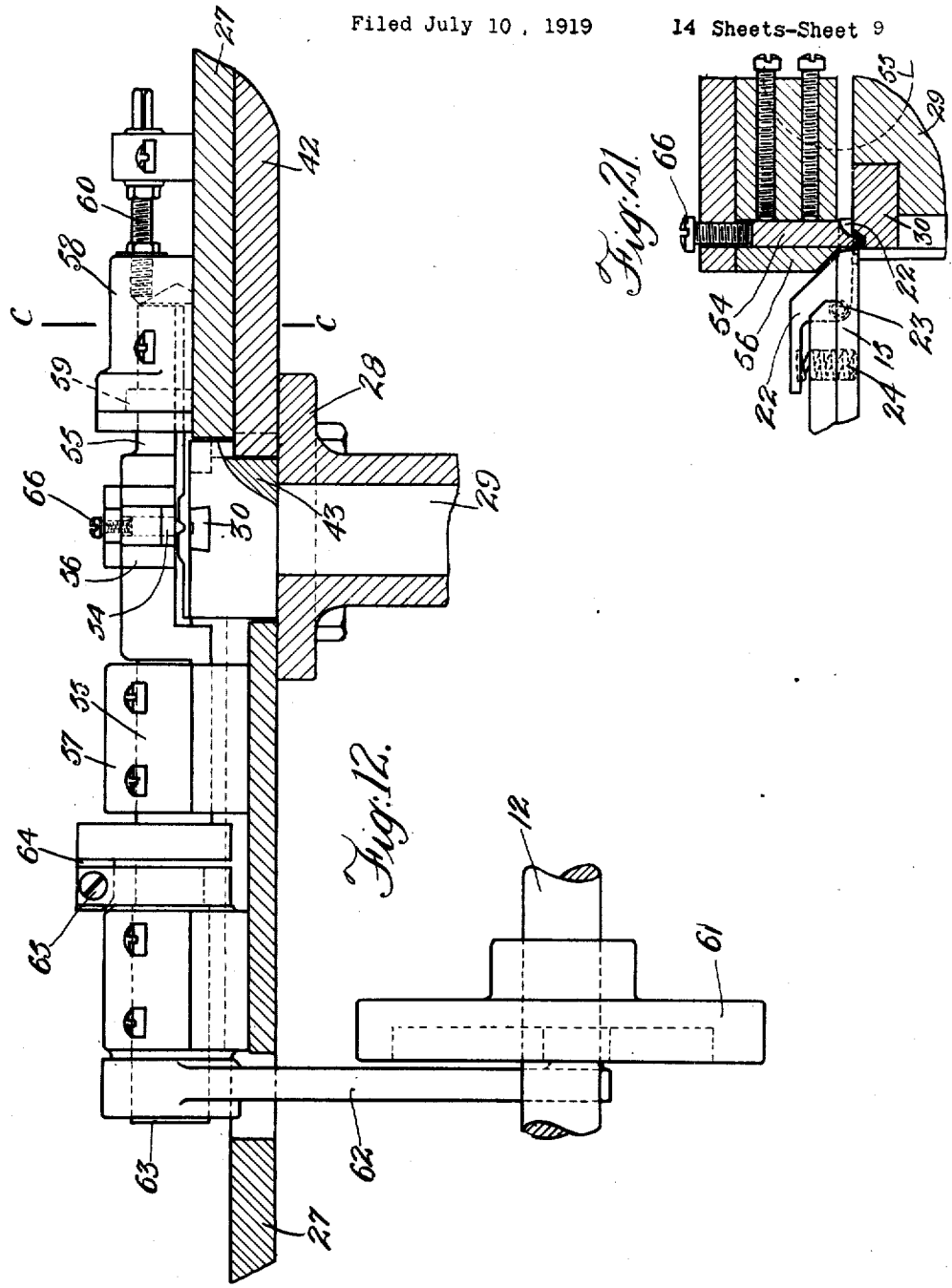
INVENTOR  
Gideon Sundback,  
BY  
ATTORNEY

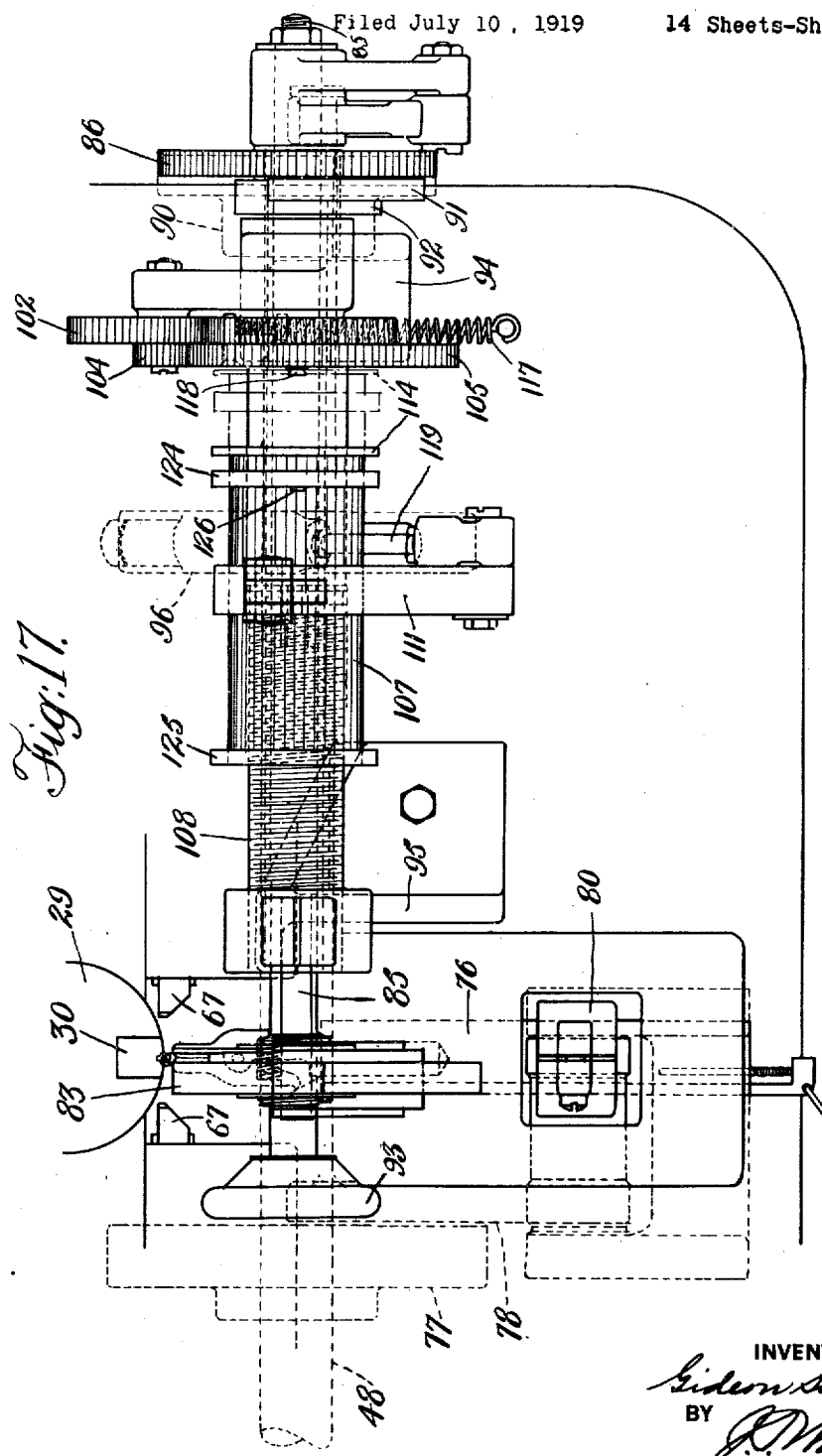

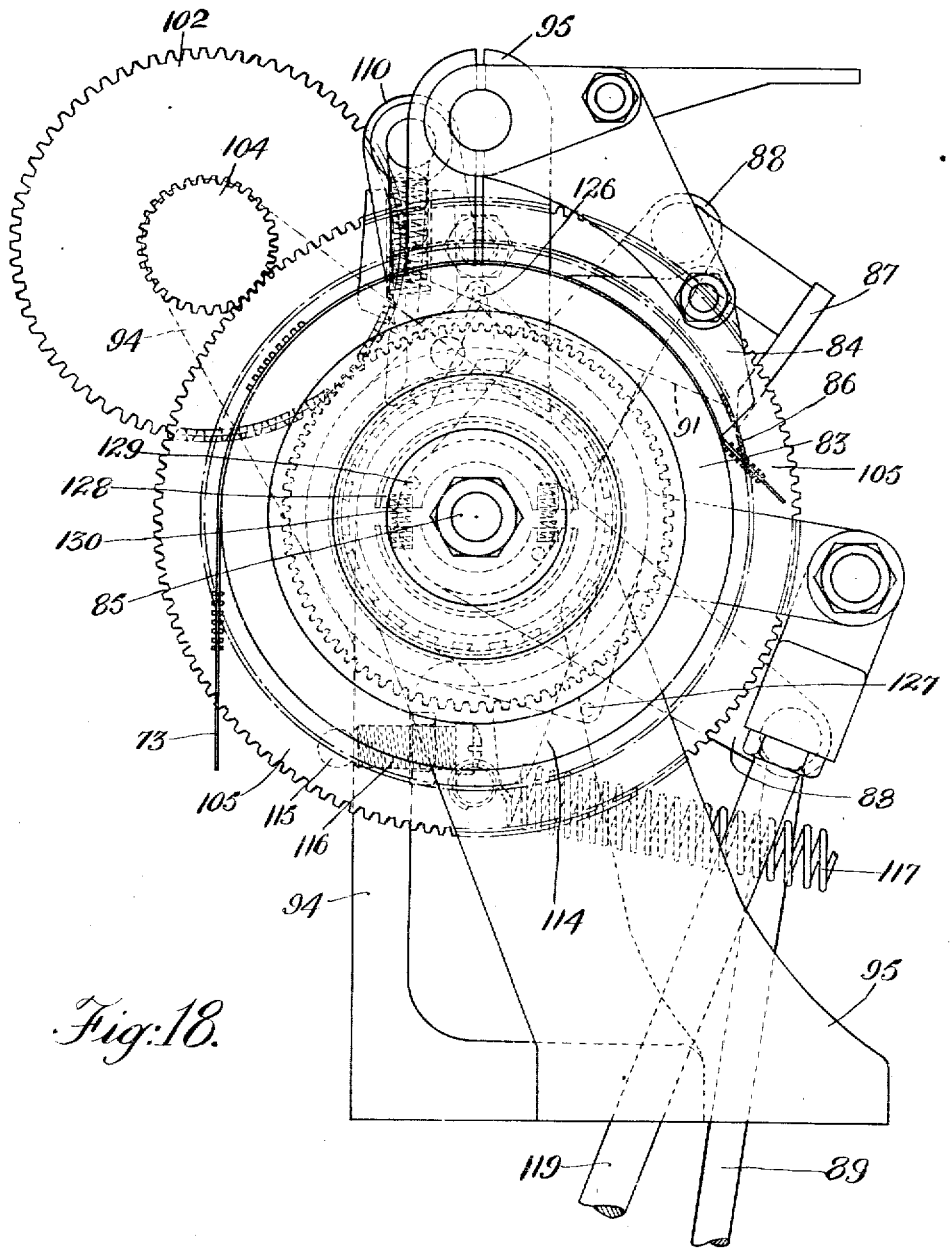

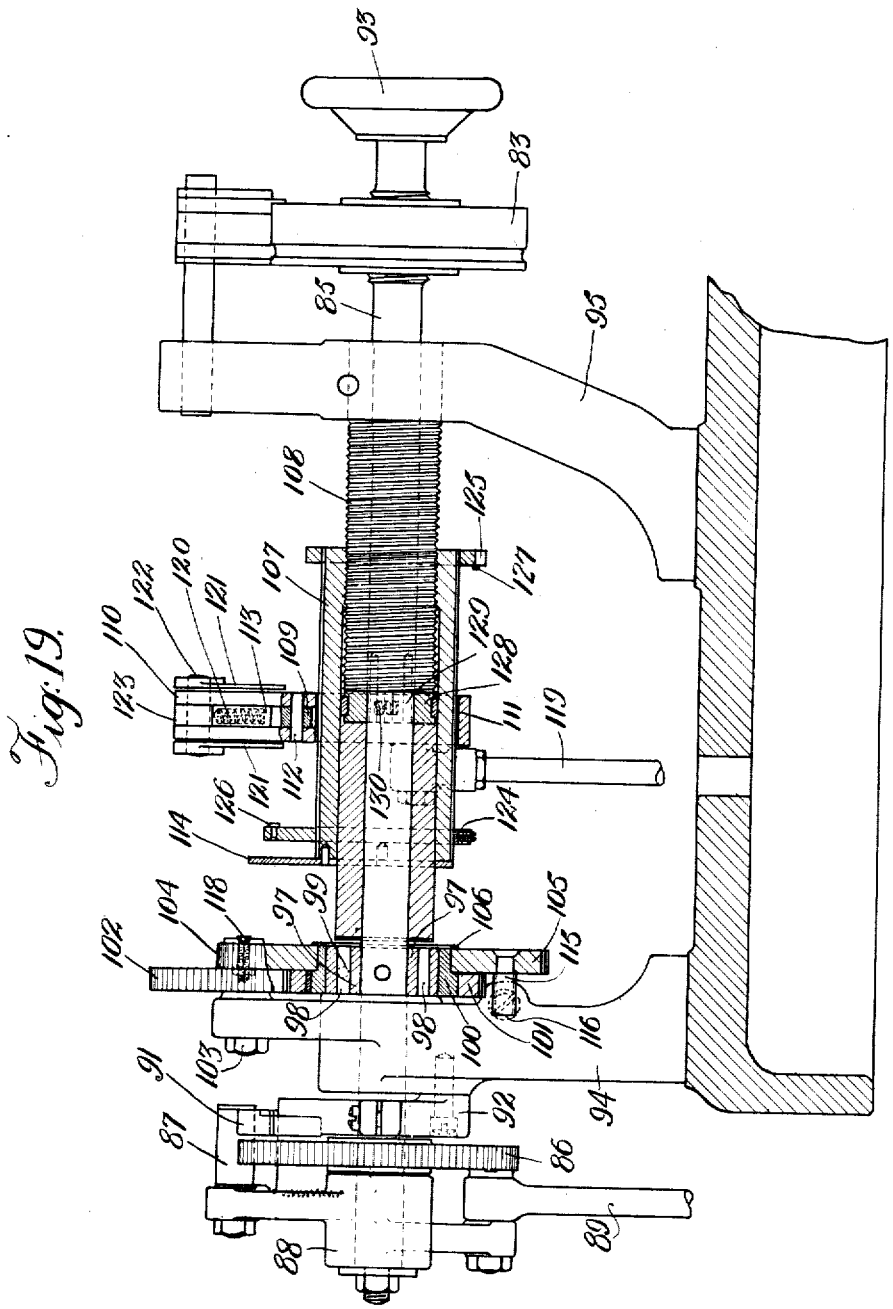

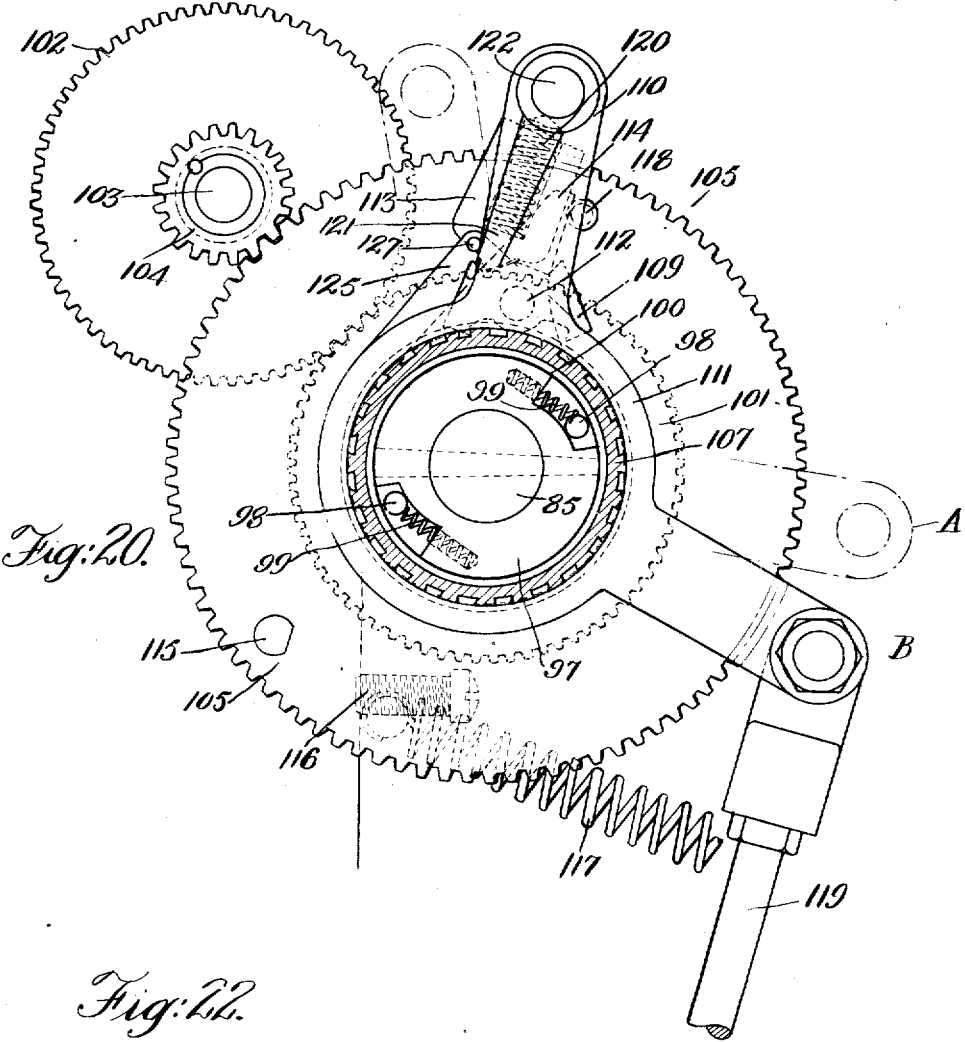
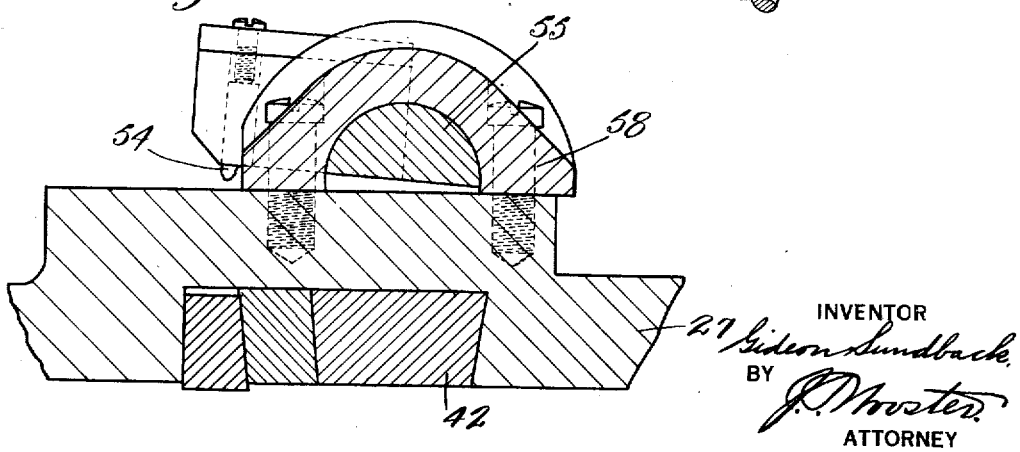

Sept. 4, 1923.

G. SUNDBACK 1,467,015

METHOD AND MACHINE FOR MAKING FASTENERS

Filed July 10, 1919  14 Sheets-Sheet 14

INVENTOR
Gideon Sundback
BY
ATTORNEY

Patented Sept. 4, 1923.

1,467,015

UNITED STATES PATENT OFFICE.

GIDEON SUNDBACK, OF MEADVILLE, PENNSYLVANIA, ASSIGNOR TO HOOKLESS FASTENER COMPANY, A CORPORATION OF PENNSYLVANIA.

METHOD AND MACHINE FOR MAKING FASTENERS.

Application filed July 10, 1919. Serial No. 309,985.

*To all whom it may concern:*

Be it known that I, GIDEON SUNDBACK, a subject of the King of Sweden, and a resident of Meadville, in the county of Crawford and State of Pennsylvania, have invented certain new and useful Improvements in Methods and Machines for Making Fasteners, of which the following is a specification.

This invention relates to a machine for shearing, forming and setting metallic pieces, and has particular reference to a special form of automatic machine with blank feeding means whereby small pieces are severed or sliced off a metallic strip of predetermined cross sectional shape, formed as by a die, and then set on a carrying element, without at any time losing control of the small pieces.

The machine illustrated herein is intended for making the fastener members shown in my Letters Patent No. 1,219,881, dated March 20, 1917, and affixing them to the corded fabric tape shown therein. The fastener member blanks consists of a body carrying separated jaws, and provided with a recess on one side and a head on the other, these respective recesses and heads being arranged on a pair of tape stringers so as to alternately interlock through a slider mounted on both stringers.

The machine of the present invention has for one of its objects to shear blanks from a strip of metal of predetermined Y cross section substantially that of the finished article, and to perfectly form the recess and head without distortion by the provision of a positive support on all sides of the blank while the forming is done.

In producing a fastener such as described in said patent, extreme accuracy and uniformity in the members themselves is required, and also in the spacing on the stringers, in order that the fastener as a whole will function properly. Also it is desirable to obtain maximum strength in the fastener members with a minimum of material, which is accomplished by first determining the desired cross section of the blank strip to give the minimum practicable width, and then the thickness of the blank for the desired rigidity of the jaws.

Another object is the elimination of all waste or scrap in the manufacture.

Another object is the elimination of delicate blanking tools whereby greater productive capacity at an equal speed is obtained and the expense for the upkeep of the machine is reduced.

Still another object is the positive setting of an accurately predetermined number of fasteners accurately spaced upon a carrying element, such as the stringer of the aforesaid patent.

And still another object is to provide a machine in which the thickness of the members can be varied to permit of an increased strength when desired. Such variation is not possible in a machine punching the members out of the flat stock, for the thickness of the strip suitable for punching is limited, and there is higher cost of operation due to wear of punches, etc., and waste of material.

Referring to the accompanying drawings and to the various views and reference signs appearing thereon:

Fig. 2 is a plan view.

Fig. 3 is a sectional view showing details of the cutting punch slide.

Fig. 4 is a sectional detail of the cutting punch slide as shown in Fig. 3.

Fig. 5 is a top view of the cutting punch slide.

Fig. 6 is an enlarged view of the cutting punch and pressure plates.

Fig. 7 is a sectional view showing details of the metal feed.

Fig. 8 is a detail top view.

Fig. 9 is an enlarged top view showing a fastener member positioned in the forming die.

Fig. 10 is a sectional side view on line B—B in Fig. 2.

Fig. 11 is a sectional end view showing forming tool details.

Fig. 12 is a sectional side view on line B—B showing the operation of forming punch.

Fig. 13 is a detail top view of a fastener member in position to be clamped on the tape.

Fig. 14 is the same view showing the clamping operation completed.

Fig. 15 is a side view of Fig. 13.

Fig. 16 is a sectional end view showing horizontal tape slide details.

Fig. 17 is a top view showing tape feeding mechanism.

Fig. 18 is an end view of tape feeding mechanism,

Fig. 19 is a sectional side view of tape feeding mechanism.

Fig. 20 is a sectional end view showing details of the tape feed.

Fig. 21 is sectional end view showing forming tool details at the moment forming is completed.

Fig. 22 is a section on line C—C Fig. 12.

Fig. 23 is an enlarged view of the forming die.

Figure 1:
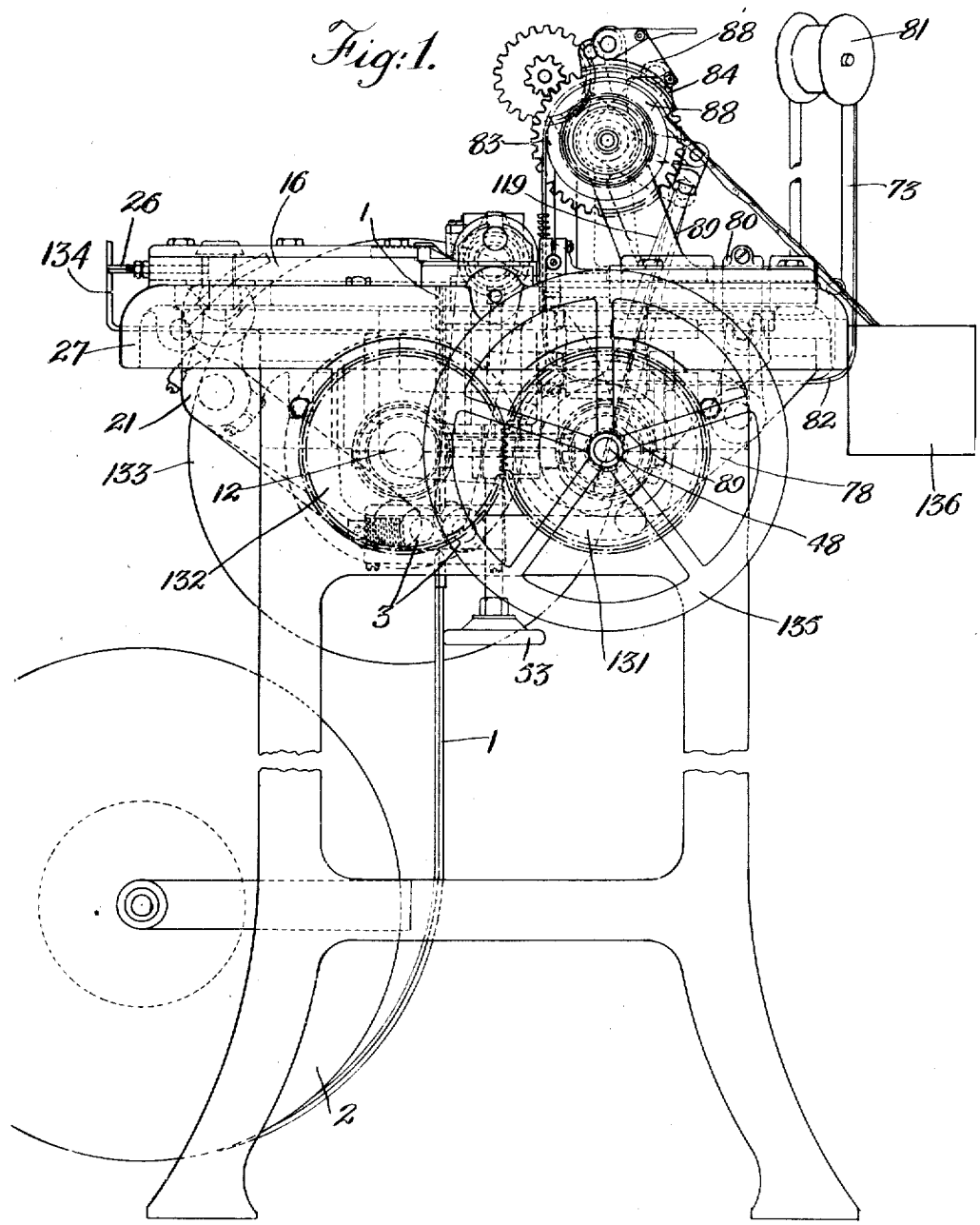
Fig. 1 is an end view of the machine.
Figure 24:
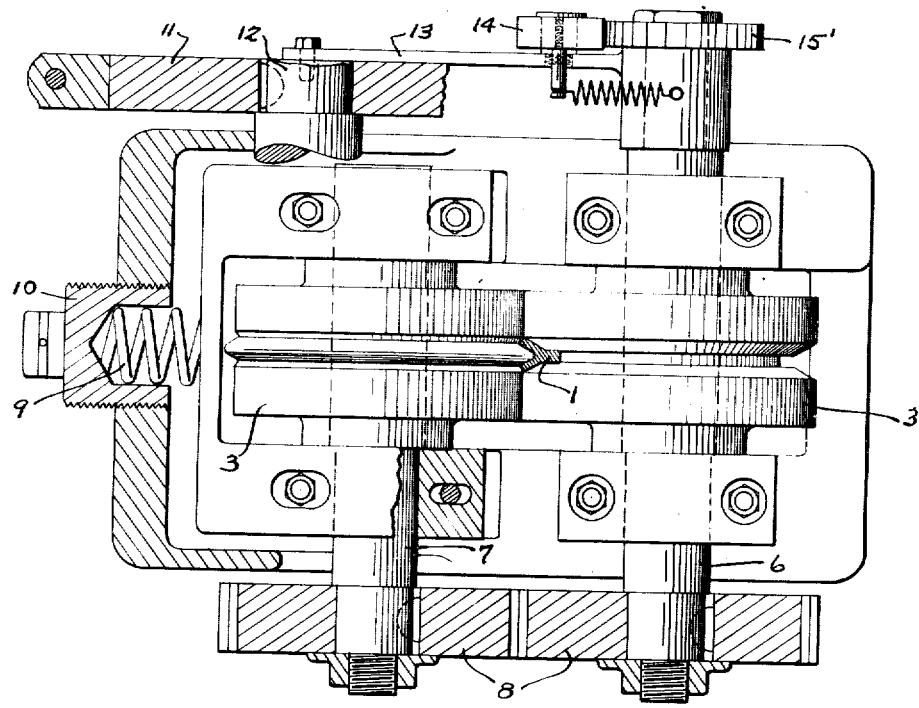
Fig. 24 is a detail plan view of the feed roll mechanism shown in Fig. 7.

In carrying out my invention I feed, as by friction rolls, a metallic strip of special alloy of predetermined cross section through a guide to shear or slice off blanks by means of a reciprocating knife having edges that somewhat conform to the section of the strip. The cutting knife carries spring plates that hold the cut blank against the knife to enable the knife to feed the blank to a revoluble set of forming dies, which form a recess on one side and a head on the other, while supported on all sides to prevent distortion. The forming die which still retains the formed blank is then rotated away from the knife to a position where the jaws of the formed member can be clamped to a carrier or a tape. The tape is synchronously fed and carries the set member away from the die. The feed of the tape is also periodically varied to form regular spaced groups each of a predetermined number of members, ready to be severed to form the pairs of stringers constituting each fastener.

Referring to Figs. 6, 7 and 8, 1 is a wire of channel shaped cross section, usually of non-rusting alloy, and so rolled or drawn as to have the sides of the channel of such section as to constitute the jaw members of the fastener members without any further operation thereon. This wire unwinds from reel 2, Fig. 1, and is fed step wise by friction rolls 3 through the guide 4 and cutting die 5. The rolls 3 are grooved to fit the shape of the wire and are mounted on shafts 6 and 7 and connected by gears 8. The friction between the rolls and the wire is adjusted by the pressure of spring 9 through the screw 10. The movement of the rolls is effected by the eccentric 11 on shaft 12 oscillating the rocker 13 pivotally mounted on shaft 6 and carrying the pawl 14. The latter acts on the ratchet 15' also mounted on shaft 6 and thereby effects an intermittent movement of the metal strip 1. The amount of this feed constitutes the thickness of a fastening member blank and is predetermined in proportion to the spacing of such members on the tape and to the required strength of the jaw members, and can be readily changed where desired without involving waste.

Referring to Figs. 3, 4 and 5, 15 is a cutting or shearing knife with its cutting edge preferably shaped to partially conform to the blank strip 1. This knife is mounted in slide 16, mounted on table 27 and is moved back and forth by cam 17 on shaft 12 through levers 18 and 19, both of which are fastened to shaft 20 rocking in bracket 21. The strip blank 1, is so positioned relatively to the knife 15 that the latter cuts from the jaw end toward the body end for the purpose of not distorting the jaws in cutting, and also so that the jaws will be in proper relation to the tape when clamped, without requiring the blank member to be turned around, and without getting out of control. Attached to extensions of slide 16 on each side of knife 15 are spring plates 22 pivoting on 23 constituting a presser foot mechanism, and acted on by compression springs 24. The knife 15 is adjusted laterally by set screw 25, Figs. 5 and 11, in desired proximity to plates 22, see Fig. 6, and retains its position relatively to the plates during the forward and back movements of the slide 16. The slide 16 has the adjusting screw 26.

Referring to Figs. 8 and 10, revolving in the bracket 28 and table 27 is the column 29 which carries the forming dies 30. The spiral gear 32 on shaft 34, driven by spiral gear 31 on shaft 12, acts as a crank plate and through the studs 35 and 36 connected by turnbuckle 37 reciprocates the rocker arm 38. The latter carries pawl 39 which acts on the ratchet 40 fastened by pins 41 to the column 29. As the spiral gear 32 revolves the pawl 39 catching in the teeth of ratchet 40 intermittently revolves the column 29 and brings in rotation the forming dies 30 into the positions illustrated in Fig. 5.

Referring to Figs. 8, 10 and 5, 42 is a slide mounted in the table 27 with its front end shaped to fit into a slot 43 in column 29. This slide is operated through the lever 44 mounted pivotally at 45 in bracket 46 by the single faced cam 47 revolving with shaft 48 on one hand and compression spring 49 on the other. When one of the dies 30 reaches the position as shown in Fig. 5, corresponding slot 43 comes into line with the tapered end of slide 42, the spring 49 moves the slide 42 forward into slot 43 as governed by the cam 47 and thereby locks the column 29 and dies 30 in position. The lock is released when the cam 47 revolves sufficiently to withdraw the slide 42 from the slot 43 against the pressure of spring 49. The column 29 is held against the back stroke of pawl 39, or accidental movement by brake 51. A hand wheel 53 is provided for turning the column 29 in setting or adjusting the dies 30 when the machine is not in motion.

Referring to Figs. 11, 12 and 22, 55 is a shaft with a crank 56 which forms a holder for the forming punch 54. This shaft rocks in bearing 57 and is supported by bearing 58 and is also axially fixed in the latter by collar 59 and axially adjustable by set screw 60. The rocking movement between the upper position of punch 54 as shown in Fig. 11, and the lower position as shown in Fig. 21, is imparted by cam 61, through lever 62, shaft 63 and coupling 64. When the forming punch is in its lower position the crank 56 in the shaft 55, adjusted by the coupling screws 65, exerts pressure on the plates 22, Figs. 6 and 21, and press the jaws of the fastener member firmly into position, and prevent distortion while the forming of the head is taking place. The punch 54 is vertically adjustable by the set screw 66, Figs. 8, 11 and 21.

Referring to Figs. 8, 11 and 6, while the column 29 is in motion and one of the dies 30 is approaching the position directly opposite the cutting knife 15 and die 5 shown in Fig. 5, the slide 16 starts the forward movement toward the column 29. The blank strip 1 is fed up with its end extending above the cutting die 5 by an amount equaling the peripheral travel of rolls 3 during a single movement thereof, or the thickness of a fastener member. The cutting knife 15 on its way forward now shears off the projecting end of blank strip 1 against the edge of cutting die 5. The plates 22, the operating end of which have been lifted by the blank strip 1 as it was fed up, are by action of the springs 24 holding the end of the metal strip to prevent displacement or ejection of the fastening member blank at the moment the cutting operation is completed. Likewise the plates 22 continue to hold the blank flat against the top of the cutting die as it is next fed forward toward the column 29 by further movement of cutting knife 15. As the column 29 stops, and the blank propelled by the cutting knife 15 on slide 16 nears the die 30 in the column 29, the locking slide 42 enters slot 43, Fig. 12, to lock the column and dies 30 in position. As the fastening member blank moves into the forming die, as illustrated in Fig. 9, the forming punch 54, Fig. 11 starts on its downward stroke and while the fastening member is held in position and confined on all sides by the cutting knife 15, plates 22 and the forming die 30, Figs. 9 and 21, the forming of the recess and projection of the member is completed, whereupon the cam 61 releases the pressure on plates 22, simultaneously lifting the punch 54; the locking slide 42 withdraws from the slot 43 and slide 16 draws back the plates 22 and cutting punch 15. The fastener member stays in the die 30, which is now free to move with the column 29 as it starts its rotary movement in an anti-clockwise direction as viewed in Fig. 8. When the slide 16 reaches its extereme outer position with the cutting knife 15 returned to initial position, see Fig. 6, the rolls 3, Fig. 7, feed the blank strip, whereupon the operations are repeated.

The finished fastener members are carried in the dies 30 by the revolving column 29, and as the die stops diametrically opposite to the place where the member was placed in the die, the jaws of the member are clamped around the corded edge of a braid or tape 73 which is fed upward parallel to the blank strip 1. The fastener member, having been attached to tape 73 in the manner above described, is then lifted out of the die by the upward feed of the tape. The tape feed is intermittent, so that the tape will be stationary during the attaching of the fastener member.

Referring to Figs. 8 and 10, 67 are two clamping tools connected with and operated through clamps 68, levers 69, which pivot on the shaft 70 in brackets 71, and double faced cams 72. The latter are keyed to shaft 48. These clamping tools press the jaws of the fastener member together on the corded portion of tape 73 as shown in Figs. 13, 14 and 15. As seen in Fig. 15 the clamping tools have an overhanging lip 74 which holds the fastening member down in the die while the clamping is accomplished. Fig. 13 shows the beginning of the clamping operation, Fig. 14 shows its completion.

Referring to Figs. 13 16 and 17, the tape 73 with corded edge to which the fastening members are clamped runs through a guide 75 which at the same time serves as a tension against the upward vertical feed of the tape. This guide 75 is held in a slide 76 which carries the tape in toward the column 29 and presses the corded edge in between the jaws of the fastening member held in the die 30, Fig. 13, while the clamping tools 67 press the jaws together and then, as soon as the vertical feed has taken place and the fastener member thereby lifted out of the die 30, withdraws the tape from the die into a position shown in Fig. 16 so as to clear the way for a free rotation of the column 29. The movement of the slide 76 is governed by the cam 77 on shaft 48, Figs. 16 and 17, bell crank 78 pivoting on shaft 79 and the adjustable clamp 80 on slide 76.

Referring to Figs. 1 and 2, the tape 73 unwinds from spool 81, passes through the guide 82 and the tension guide 75, Fig. 16, and across the tape roll 83 which, operated in a clockwise direction, as viewed in Fig. 18, controls the vertical movement of the tape 73 in conjunction with the sliding shoe 84, to control the spacing of the members by feeding the tape 73. The tape roll is mounted on shaft 85, Figs. 18 and 19, which is operated by the ratchet 86, pawl 87, bell crank 88 and pitman 89, Figs. 1, 2, 17 and 19, and crankplate 90 keyed onto the end of shaft 48, controlling the tape feed for regular spacing.

The shield 91 and the long stroke of pawl 87 serve as a means of reducing the time of the actual tape feed to a small proportion of the pawl travel, in other words, shortens the time of feeding the tape so as to allow as much time as possible for other operations of the machine. 92 is the support or holder of the shield 91 and at the same time serves as a brake to hold the feed roll 83 against accidental rotary movements. 93 is a handwheel attached to shaft 85, for adjustment purposes.

Referring to Figs. 17, 19 and 20, the special feed mechanism, located between the two housings 94 and 95, is operated by eccentric 96 on shaft 48, to provide for the extra tape feed which produces the blank length of tape between two groups of fastener members. 97 is a friction ratchet on shaft 85, with two rolls 98 and springs 99, constructed like ordinary friction ratchets, so that when the encircling ring or bushing 100 is moved in a clockwise direction as viewed in Fig. 20, the rolls 98 wedge between the spiral surface of the ratchet and the inner surface of the bushing 100, and move the shaft 85 with it, whereas if the bushing moves in an anti-clockwise direction or the shaft in a clockwise direction, the binding contact between the two is released. Thus the shaft travels in a clockwise direction during the period of regular spacing of members on the tape without disturbing the position of the bushing 100. Keyed to the bushing 100 is a gear 101 which meshes with the gear 102 and revolving on the stud shaft 103, Figs. 19 and 20. Fastened to the gear 102 and revolving with it on the shaft 103 is the gear 104 which is in mesh with gear 105. The latter is idle on the bushing 100 and held against axial movements by the washer 106. Now if the idle gear 105 is moved in a clockwise direction, as shown in Fig. 20, the motion is transmitted through the meshing gears and the friction ratchet 97 to the shaft 85 so that the tape roll 83 is rotated in the same direction. The extent of the movement of the tape roll as compared with the movement of the gear 105 is determined and adjusted by the selection of the gear ratio. The idle gear 105 carries a stop 115 which abuts against the adjusting screw 116, and is held in that position by the spring 117. The gear 105 also carries the catch 118, threaded into the gear and by reason thereof adjustable in an axial direction. The radial position of the catch is adjusted by the set screw 116.

Referring to Figs. 17, 19 and 20, 107 is a drum threaded on extension 108 of the housing 95. The drum is revolved by the double pawl 109 pivoted at 112 on extension 110 of rocker ring 111, and held in actuating position for rotating the drum in either direction by spring plunger 113. The rocker ring is moved by eccentric 96 through connecting rod 119. Attached to the end of the drum 107 is arm 114. As the drum revolves clockwise as seen in Fig. 20, it moves toward the housing 94, Figs. 17 and 20. The arm 114 revolves with the drum, and when the drum reaches the end of its travel, arm 114 strikes catch 118, Figs. 17 and 20, and moves gear 105 and through the train, friction ratchet 97 and tape roll 83. This movement of the tape roll is ordinarily limited to one step in the rotation of the drum as imparted to it through the rocker arm by one revolution of the machine, but if the blank space of tape between the groups of members should not be sufficient, the drum may be allowed to move the tape roll a few steps in succession. The direction of the movement of the drum 107 is governed by the position of the spring plunger 113. When the latter is positioned in one of the two notches on back of the pawl 109 the spring 120 holds the plunger there and the pawl 109 in the same actuating position revolving the drum until the plunger by action on one of the two levers 121, Figs. 19 and 20, is forced into the other notch and reverses the rotation of the drum. The levers 121 are connected to the spring barrel 123 through the shaft 122. The spring barrel is slidably fitted into and guides the plunger 113.

Referring to Figs. 17 and 19, adjustably mounted on the revolving drum 107 are the rings 124 and 125 carrying the pins 126 and 127 respectively. These rings move spirally with the drum and the pins 126 and 127 are alternately brought against the levers 121, and by pressure on one of these levers, the spring plunger is moved from one actuating position on the back of pawl 109 into the other, always alternating so that the drum keeps constantly moving back and forth between the limits set by the positions of the rings 124 and 125. The position of ring 125 is adjusted so that the pressure of pin 127 reverses the direction of the drum 107 by pressure on the lever 121 at the moment the arm 114 has moved the gear 105 and the tape roll 83 to effect the blank space of tape which determines the end of the fastener stringer. The position of the parts of the mechanism at this moment is illustrated in Fig. 20. The pawl 109 is in position to actuate drum 107 in a clockwise direction, and arm 114 has just moved gear 105 by pressure on catch 118 as the extension of rocker ring 111 made the last trip from its upper position at A to its lower position at B. At the same time pin 127 on ring 125 was moved up to lever 121. As the rocker ring now moves upwards towards its position at A drum 107 is held against the back stroke of pawl 109, and the pressure on pin 127, by an internal brake consisting of a split collar 128 fastened by pins 129 to the housing extension 108 and expanded by springs 130, Figs. 18 and 19. When position A is reached, the plunger 113 will have been forced over into the other notch on pawl 109, starting drum 107 back in the anti-clockwise direction.

As soon as the drum starts the back movement of arm 114, gear 105 is brought back to its original position with stop 115 against set screw 116 by spring 117. The other gears of course move also, but as this is the back stroke of the bushing 100 on the friction ratchet 97, shaft 85 is not disturbed by this backward movement. The drum keeps on travelling anti-clockwise until pin 126 on ring 124 again reverses the direction by pressing spring plunger 113 back to its position illustrated in Fig. 20. The drum thus travels back and forth, and the number of stepwise movements between each movement of the gear 105 is determined by the position of pin 126 on ring 124. In this manner, the length of a fastener can be regulated by exact counting of the fastener members, from two or three in a group, to the limit allowed by the maximum travel of the drum.

Referring to Figs. 1 and 2, shafts 12 and 18 are connected and run at the same speed by gears 131 and 132, and the cams, eccentric, and crank plate on shaft 48 are timed so as to perform the clamping of the fastener members to the tape simultaneously with the shearing of wire 1 on the opposite side of column 29, and so as to feed the tape with the attached fastener member simultaneously with the feed of wire 1. When the column comes to rest and is locked by slide 42, tape slide 76 carrying guides 75 moves the tape towards the formed member located in the die 30 in line with the direction of the slide movement. The clamping tools 67 on each side of the member are set in motion, and when the corded edge of the tape is pressed in between the jaws of the member the clamping tools close in and complete the clamping operation. Immediately the clamping tools commence to withdraw and as soon as the fastener member will clear the overhanging lip 74 of the withdrawing tools, pawl 87 acts on ratchet 86 to feed the tape upward and lift the attached fastening member out of die 30. At the end of the latter operation, the outward movement of slide 76 takes place. The column is released and moved another step which brings a new member in the succeeding die and the operations are repeated.

The machine is driven by pulleys 133, Figs. 1 and 2, and stopped and started by belt shifter 134. 135 is a wheel for turning the machine by hand. Box 136 receives the tape as it is fed out of the machine with fastener members attached.

By the elimination of scrap, 50% of the material required by former machines is saved, and by better distribution of metal in the sheared blanks, 25% more is saved, in making fasteners of equal strength, this latter saving being largely in the thinner jaws permitted by shearing as compared with punching. Also there is a large saving in maintenance, owing to the omission of blanking out punches, and less wear and tear on the shearing knife.

It will thus be seen that this machine will shear blanks of substantially finished cross sectional shape from a strip or metal wire of predetermined cross section without any waste or scrap and also perfectly form the recess and projection, as the positive support on all sides during the punching or forming will prevent any distortion. The machine by means of the rotatable die column cooperating with setting punches and an accurately controlled and synchronized tape feed will set the blanks upon a carrier in such a manner that the blanks are in accurately spaced groups of blanks and which are of predetermined number of blanks in each group.

The shape of the member is governed by the cross sectional shape of the metal strip and hence the machine is adapted to make members of different shape and for different purposes than the fasteners herein indicated and I do not desire to be limited in this respect. Certain mechanisms might be omitted, such as the forming punch, in the manufacture of other forms of fasteners or the carrier and feeding device.

Having now set forth the object and nature of my invention and various arrangements embodying the principles thereof, what I claim as new and useful and of my own invention, and desire to secure by Letters Patent is:

1. The combination with means for severing a blank member from the end of a strip, of means for affixing said member to a tape.

2. The combination with means for severing a blank member from the end of a strip, of means for shaping the blank, and means for feeding out said member from said shaping means.

3. The combination with means for severing a blank member from the end of a strip, of means for feeding the member to a die, means for shaping the member, and means for feeding out said member from said shaping means.

4. The combination with means for feeding a blank strip, of means for severing a blank member from the end of said strip, means for shaping the member and means for feeding out said member from said shaping means.

5. In a machine for making fasteners, the combination with means for severing successive lengths from a wire, of means for deforming each severed length to provide interlocking surfaces, and means for bending and clamping said severed length upon a tape.

6. The combination with intermittent means for feeding a blank strip, of a reciprocating knife for slicing blank members from the end of said strip and holding the cut blanks while feeding them to a die, means for forming said member in the die, and means for feeding out the formed member from said die.

7. The combination with means for feeding a blank strip, of means for severing a blank from the end of said strip and holding said blank to prevent distortion while it is being shaped, means for shaping said blank, and means for feeding out and setting the formed member on a carrier element.

8. The combination with means for feeding a strip of predetermined cross sectional shape, of means for slicing a blank member from the end of said strip and holding it to prevent distortion while being formed, means for forming said member, means for setting said member on a carrier element and means for feeding the carrier element and attached member away.

9. The combination with intermittent strip feeding means, of means for severing an entire cross sectional part of the strip, forming means for the severed pieces, and means for holding the severed pieces against spreading while being formed.

10. The combination with intermittent strip feeding means, of a knife for severing a blank jaw member from the end of the strip, means for feeding forward said jaw member, means for forming a recess in said member, and means for feeding the said member out of the machine.

11. The combination with intermittent strip feeding means, of a knife for slicing off a blank jaw member from the strip, means for feeding forward said jaw member, means for forming a projection on said member, and means for feeding the said member out of the machine.

12. The combination with means for slicing a blank fastener member from a strip, said strip having its cross section predetermined to provide a pair of separated jaws on the fastener member, of means for feeding a carrier element between said jaws, and means for pressing the jaws together on said element.

13. A machine for forming jaw shaped interlocking fastener members, comprising in combination means for intermittently feeding a grooved wire, a knife for severing successive blanks from said wire and for guiding a severed blank to a forming die, a forming die, and a punch to deform the m - terial of said severed blank at the vertex of its groove to form opposite interlocking surfaces.

14. The combination with means for slicing a member from a strip, said strip having its cross section predetermined to provide a pair of separated jaws on the member, means for inserting the edge of a tape between said jaws, and means for pressing the jaws together on the tape.

15. The combination with means for feeding a strip of Y cross section, of means for slicing a blank therefrom having jaws and a body, means for feeding the blank into a die, means for forming the body with a recess on one side and a head on the other, means for feeding a tape between the jaws, and means for setting the jaws on the tape.

16. The combination with means for feeding a strip of predetermined cross section, means for slicing off members having jaws, means for feeding a continous tape between said jaws, means for pressing said jaw members on said tape, and means for varying the feed of said continuous tape to vary the spacing of said members.

17. The combination with means for feeding a metal strip of irregular cross sectional shape, of means for slicing from said strip an element having separated jaws at its forward end, means for attaching said jaws to a carrier.

18. The combination with means for severing members from the end of a metal strip of predetermined cross sectional shape of means for affixing said members to a strip in accurate spaced relationship.

19. The combination with means for slicing members from a metal wire of irregular cross section, of means for affixing said members to a strip in accurate spaced relationship, and means for varying the spacing to form groups of members of a predetermined number.

20. The combination with means for feeding a strip a predetermined amount, o means for severing a blank member from the end of said strip, means for shaping the member, and means for feeding out said member from said shaping means.

21. The combination with means for slicing a member of any predetermined thickness from a strip, of means for shaping the member and means for feeding out said member from said shaping means.

22. The combination of a cutting die hav ing an orifice, means for feeding a wire having an indented cross section through said orifice, the latter being shaped to accommodate said wire, a knife having a cutting edge shaped to engage the indentation of said wire, means for reciprocating said knife across the face of said cutting die to cut off successive lengths from said wire, and means for attaching said lengths to a tape.

23. The combination of a cutting die having an orifice, means for intermittently feeding a wire having an indented cross section through said orifice in predetermined lengths, a knife having a cutting edge shaped to engage the indentation of said wire, means for reciprocating said knife across the face of said cutting die to slice each length of wire fed through the orifice to form a blank fastener member, means for shaping said member, and means for holding said member with its indented portion against the corresponding portion of the knife edge to prevent distortion while shaping.

24. The combination with means for feeding a strip, means for severing a member from the end of the strip, means for holding the member against said severing means to permit the member to be fed forward thereby, means for shaping said member, and means for feeding out said member from said shaping means.

25. The combination with means for feeding a strip, of means for severing a section from said strip to form a blank fastener member, a rotatable column, a die mounted on said column, a punch, means for actuating said punch to engage said die, spring plates cooperating with said severing means to feed said member to said die and to hold said member in the die during the actuation of the punch, means for setting the member on a tape, means for rotating the column to feed the member from said punch to said setting means, and means for feeding the tape.

26. The combination with means for feeding a strip, of means for severing a section from said strip to form a blank fastener member, a rotatable column, a die mounted on said column, a punch, means for actuating said punch to engage said die, spring plates cooperating with said severing means to feed said member to said die and to hold said member therein during the actuation of said punch, means for locking said column during the actuation of the punch, means for setting the member on a tape, means for unlocking and rotating the column to feed the fastener member from the punch to the setting means, and means for feeding the tape.

27. The combination with means for feeding a strip of predetermined cross section, means for severing a member from said strip, a punch and die for forming said member, spring plates cooperating with said severing means and said die to hold said member during the forming to prevent distortion, and means for feeding out said member from said die.

28. The combination with means for severing a member from a metal strip of irregular cross section, means for shaping the member, tape feeding means, means for setting said member on said tape and means to vary the tape feed to vary the spacing of the members on said tape.

29. The combination with means for severing a member from a metal wire of predetermined cross sectional shape, means for clamping said member to a tape, the said clamping means having overhanging lips to hold said member during the clamping.

30. In a machine for making fasteners, a revoluble column having a plurality of dies, means for feeding blanks to said dies, means for forming the blanks, and means for attaching the formed blanks to a carrier.

31. The combination with means for severing blanks from the end of the wire, of a revoluble column having a plurality of dies, means for feeding blanks to said dies, means for forming the blanks and means for attaching the formed blanks to a carrier.

32. A machine for making jaw fastener members comprising in combination a movable die in which said members are adapted to be deformed to provide an interlocking surface, means for intermittently feeding the members to said die, and means for moving said die after the formation of said interlocking surface for affixing the members to a tape.

33. The combination of a rotatable column having a plurality of dies, means for feeding blanks to the dies, means for forming the blanks in the dies, means for feeding a tape, means for attaching the formed blanks to said tape, means for intermittently rotating the column to bring the formed blanks into position for so attaching, and means for holding the tape away from the column during the rotation of the latter.

34. The method of making fastener members which comprises forming a strip of predetermined cross section, slicing blank members from the end thereof, forming said members to provide interlocking surfaces, and setting said formed members on a carrier by distortion.

35. The method of making fastener members which comprises forming a strip of predetermined cross section, slicing blank members from the end thereof, forming interlocking surfaces on each blank member, and compressing said members on a carrier independently of said interlocking surface.

36. The method of making fastener members which comprises forming a strip having an indented cross section, slicing the blank fastener members from the end of the strip, forming the vertices of said members into socket and head portions, and clamping said formed members upon a carrier inserted in the indentations.

37. The method of making fastener members which comprises forming a channelled strip, slicing blank members from the end of the strip having jaws formed by the channel sides, and clamping said jaws upon a tape inserted therebetween.

38. The method of making jaw member interlocking fasteners, which comprises severing a strip from the end of a wire and simultaneously feeding the strip toward a die, deforming said strip to provide an interlocking surface and moving the deformed strip to a carrier.

39. The method of making fastener member blanks, which comprises slicing such members successively from a preformed strip of cross section approximating the outline of the blank member.

40. The method of making fastener members which comprises slicing blank members from a preformed strip of generally Y-cross section, the blanks each having a base and a pair of arms, said arms and base being arranged in accordance with the Y-cross section of the strip, forming a socket and a head in the base portion of each blank, and compressing the arms of the member on a carrier.

41. In a machine for making interlocking fastener jaw members, the combination with means for severing successive blanks from the end of a wire, of a movable die, means for moving a severed strip onto said die, punching means adapted to cooperate with said die to form an interlocking surface on said strip intermediate the material of the jaw portions, and means for adjusting the alignment between the die, punching means, and strip moving means.

42. In a machine for making interlocking fastener jaw members, the combination with means for severing successive strips from the end of a wire, of a movable die, means for moving a severed strip onto said die, punching means adapted to cooperate with said die to form an interlocking surface on said strip intermediate the material of the jaw portions, and means for locking the die in position for punching.

43. In combination with means for intermittently feeding a tape in the direction of its length, means for clamping a fastener member on said tape during each pause in the feed thereof, means for feeding fastener members to said clamping means, and means for effecting a transverse movement of said tape during each actuation of said fastener feeding means to clear the latter.

44. In a fastener attaching machine, a tension device for holding a tape, means for intermittently feeding a tape lengthwise through said tension device, means for clamping a jaw shaped fastener member upon the tape during each pause in the movement thereof, means for feeding fastener members to said clamping means, and means for reciprocating said tension device during each pause in the feed of said tape to effect clearance between the tape and the fastener feeding means.

45. In a fastener attaching machine, a tape control, comprising a tension device, means for intermittently feeding a tape through said tension device, automatic means for reciprocating said tension device during each pause in the feed of said tape, and means for affixing the fastener to the tape.

46. In a machine for forming blanks, a rotatable column having a plurality of dies, means for feeding the blanks to said dies, means for forming the blanks in the dies, means for attaching the formed blanks to a carrier, and means for rotating the column to bring the blanks into position for so attaching.

47. The combination with means for cutting blanks, of a rotatable column having a plurality of dies, means for feeding the blanks to said dies, means for forming the blanks in the dies, means for attaching the formed blanks to a carrier, and means for rotating the column to bring the blanks into position for so attaching.

48. The combination with means for slicing blanks from a strip having its cross section predetermined to give a desired outline to the blanks, of a rotatable column having a plurality of dies, means for feeding the blanks to said dies, means for forming the blanks in the dies, means for attaching the formed blanks to a carrier, and means for rotating the column to bring the blanks into position for so attaching.

49. The combination with means for intermittently feeding a strip having a preformed uniform cross section, of means for slicing successive blank members therefrom having the outline of said cross section, and including compressible jaw members, means for feeding a carrier element and the blank member jaws together, and means for compressing the jaws on the carrier element.

50. The combination with means for intermittently feeding a strip having a preformed uniform cross section, of means for severing successive blank members therefrom having the outline of said cross section, and means for forming the blank members to a predetermined shape within said outline.

51. The combination with means for intermittently feeding a strip having a preformed uniform cross section, of means for severing successive blank members therefrom having the outline of said cross section, means for forming the blank members to a predetermined shape, means for attaching the formed members to a carrier, means for feeding the sheared members from said shearing means to said forming means and thence to said attaching means, and means for feeding the carrier.

52. The combination with means for intermittently feeding a strip, of means for severing successive members therefrom, each of said members having the same outline as the cross section of the strip, means for attaching the severed members to a carrier, means for feeding the severed members from said severing means to said attaching means, and means for feeding the carrier.

53. A machine for forming jaw members comprising in combination means for intermittently feeding a grooved wire, a forming die, a knife for severing successive strips from said wire and for guiding a severed strip to said die, means adapted for cooperation with said die to deform the material at the vertex of the jaw portions to form an interlocking surface, means for withdrawing the knife and inserting a tape between the jaw portions of said severed strip while in said die, and means for closing the jaw portions on said tape.

54. In a machine for forming jaw fastener members, the combination with means including a die for deforming a blank member intermediate the material forming its jaw portions to provide opposite interlocking surfaces, of means for laterally moving a tape in between said jaw portions for attaching the member to the tape, and for longitudinally moving the tape to remove said member from the die.

55. The combination with means for feeding a strip of predetermined cross sectional shape, of means having an edge complementary to the adjacent side of said strip for slicing from said strip successive flat members having the outline of said cross section, means for forming interlocking surfaces on the successive members while engaged with said slicing means, and means for holding said members during forming to prevent distortion.

56. In a machine for forming jaw fastener members, the combination with means for cutting a strip adapted to form such member, of a die adapted to deform a portion of said strip and produce an interlocking surface thereon, said cutting means being adapted to guide said strip to the die and assist in holding said strip on the die during its deformation.

57. In a machine for forming the connecting members having jaw portions of a slide fastener, the combination with means for severing blank members from the end of a wire, of means for changing the cross section of said members at one portion to provide interlocking parts and means for bending and clamping said members to a tape.

58. In a machine for forming jaw members, the combination with an intermittent wire feeding means, of a knife adapted to sever successive strips from the end of a wire, yieldable means for cooperation with the side of said strip opposite its severed surface during and after said strip is severed, a die in which the material of said strip intermediate its jaw forming portions is adapted to be deformed to provide an interlocking surface and means for clamping said yieldable means to assist in holding said strip in said die.

59. In a machine for making interlocking jaw fastener members, the combination with an intermittent wire feeding means, of a knife adapted to sever successive strips from the end of a wire, a die in which a severed strip is adapted to be deformed intermediate the material of its jaw portions to provide an interlocking surface, and means for guiding said severed strip to the die and for holding the same in position on the die, said last mentioned means including the aforementioned knife.

Signed at New York city, in the county of New York and State of New York, this 7th day of July A. D. 1919.

GIDEON SUNDBACK.

DISCLAIMER 1,467,015.—*Gideon Sundback*, Meadville, Pa. METHOD AND MACHINE FOR MAKING FASTENERS. Patent dated September 4, 1923. Disclaimer filed March 7, 1934, by the assignee, *Hookless Fastener Company*.

Hereby enters this disclaimer to that part of said specification which is in the following words, to wit:

"The shape of the member is governed by the cross sectional shape of the metal strip and hence the machine is adapted to make members of different shape and for different purposes than the fasteners herein indicated and I do not desire to be limited in this respect. Certain mechanisms might be omitted, such as the forming punch, in the manufacture of other forms of fasteners or the carrier and feeding device."

[Page 5, lines 101 to 110 inclusive.]

And your petitioner further disclaims from the scope of each of claims 1 to 33, inclusive, and 41 to 59, inclusive, any combination or any machine, and from the scope of each of claims 34 to 40, inclusive, any method of making, except one for forming and affixing to a tape carrier slide fastener members such as are described in the sentence beginning in line 24, of page 1 of the specification and reading as follows:

"The fastener member blanks consists of a body carrying separated jaws, and provided with a recess on one side and a head on the other, these respective recesses and heads being arranged on a pair of tape stringers so as to alternately interlock through a slider mounted on both stringers."

[*Official Gazette March 27, 1934.*]

DISCLAIMER 1,467,015.—*Gideon Sundback*, Meadville, Pa. METHOD AND MACHINE FOR MAKING FASTENERS. Patent dated September 4, 1923. Disclaimer filed September 14, 1936, by the assignee, *Hookless Fastener Company*.
Hereby disclaims claims 32, 46, 47, and 54 of said patent.
[*Official Gazette October 13, 1936*]